Sept. 30, 1952
F. W. BAUM
2,611,959
DENTAL MOLD TRAY
Filed Nov. 5, 1949
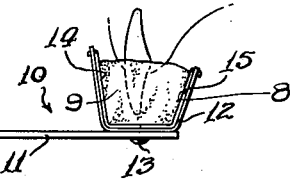
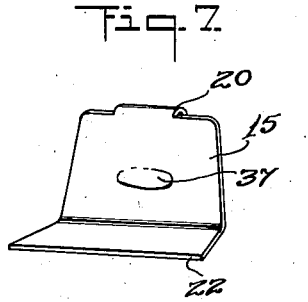
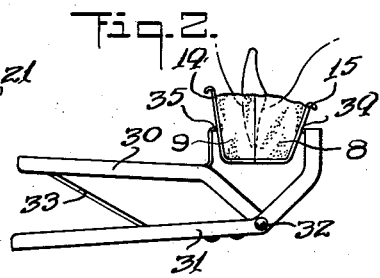
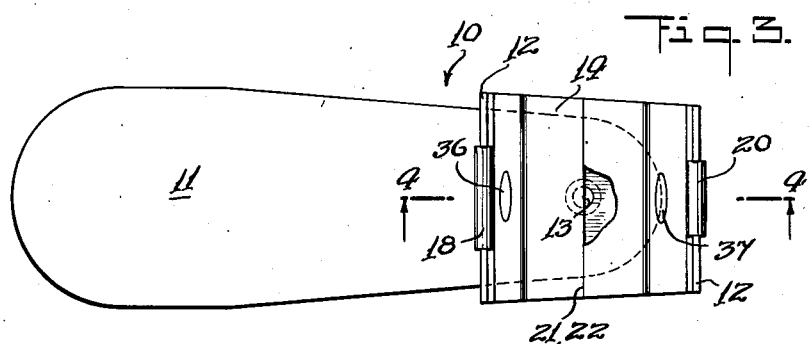
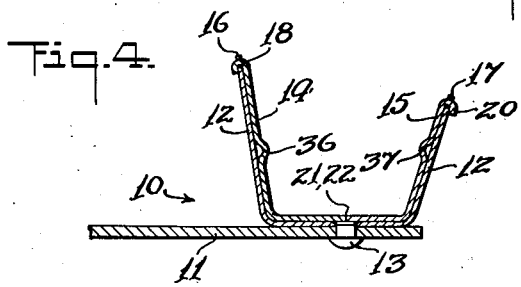
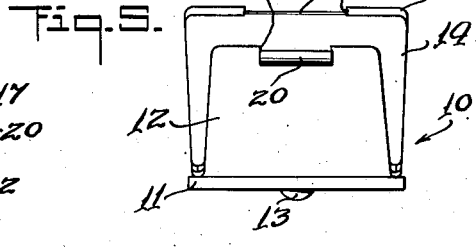
INVENTOR.
F. WILBUR BAUM
BY Darby & Darby
ATTORNEYS Patented Sept. 30, 1952

2,611,959

UNITED STATES PATENT OFFICE 2,611,959

DENTAL MOLD TRAY

Frederick Wilbur Baum, Scarsdale, N. Y., assignor to Mechanical Equipment Corp., Paterson, N. J., a corporation of New Jersey Application November 5, 1949, Serial No. 125,826

1 Claim. (Cl. 32—18)

The present invention relates to a separable mold tray and to means for clamping the severed portions of the mold upon the teeth to aid in filling teeth with themosetting plastic materials. It has been suggested that the filling materials presently used in dentistry be replaced with materials of the general class of thermosetting plastics. Of these plastics, resins of the acrylic acid type or acryloids are those most used.

As indicated above, acrylic resins or acryloids are commercially sold for use as dental filling material. Suppliers of acrylic material for dental use caution the dentist that the material after insertion in a properly prepared cavity must be held in position for at least ten minutes in order that the acrylic material properly bond to the walls of the cavity. It has been found to be virtually impossible for the dentist and the patient to remain immovable during this relatively long period, with the result that such filling material has not been extensively used, since in many instances where it has been attempted the patient has scarcely left the dental chair before the filling has fallen from his tooth.

My invention supplies a means for clamping a plastic filling in a tooth in which a pressure plate for the clamping means conforms to one of the surfaces of the tooth to thereby permit of clamping the filling firmly in place in a cavity in the opposite tooth surface. As will readily be appreciated, the pressure plate, were it not so conformed to the tooth surface, would tend to slip from the inclined surface of the tooth and would render it virtually impossible to properly clamp the filling in place for the time necessary for the filling material to set and bond to the cavity. By thus clamping the filling in the tooth during the relatively long period required for the setting of the plastic material, complete assurance is given that the filling will be properly bonded to the tooth.

In a preferred form of the invention I may provide the pressure plate mentioned by utilizing a split molding tray forming an impression of the inner and outer surfaces of the tooth to be filled prior to cavity preparation (and in some instances with the cavity temporarily filled) then break the impression so formed in plaster of Paris or the like, in half and thereafter utilize the rear half as the pressure plate for my clamping means and the forward half as the bearing material on the filling. However, it is not necessary that the process be performed in this manner, since the impression of one surface of the tooth may be taken directly upon one arm of a clamping member and the other arm of the clamping member be utilized to press against a small plate of gold or the like, which in turn presses against the plastic filling.

It is an object of my invention to provide a clamping member for utilization in holding a plastic filling in position in a tooth cavity, which clamping member has a pressure plate which conforms to the outline of a tooth surface and which is utilized in connection with a plate bearing against the plastic filling placed in a cavity in the opposite tooth surface.

It is another object of my invention to provide a split molding tray in which molding material may be placed to form an impression of the tooth prior to cavity preparation and which mold may be broken in half to provide a pressure plate and bearing plate for clamping a filling in place in a tooth cavity.

It is another object of my invention to provide a simple holding device for the split molding tray above mentioned.

It is another object of my invention to provide a clamping means to be utilized to hold a pressure plate against one surface of a tooth and to hold a plastic filling in a cavity in the opposite tooth surface.

Other objects and features of the invention will appear in the following description considered in connection with the appended drawings, in which:

Figure 1 is a side elevational view showing one mode of preparing a pressure plate for use in clamping a plastic filling in place in a tooth cavity;

Figure 2 is a side elevational view showing the use of a pressure plate in clamping a tooth filling in position;

Figure 3 is a top plan view of a preferred mode of making a pressure plate comprising a split molding tray and a holding device therefor;

Figure 4 is a fragmentary vertical cross-sectional view of the device of Figure 3;

Figure 5 is a side elevational view of the device of Figure 3 showing particularly the mode of holding the halves of the split molding tray in the holder therefor;

Figure 6 is an enlarged perspective view of one of the two halves of the molding tray; and Figure 7 is an enlarged perspective view of a second of the two halves of the molding tray.

As has been indicated above, a pressure plate 8, Figures 1 and 2, is prepared and is then held in place by a suitable clamping device such as that illustrated in Figure 2 to hold the plastic filling in position. In the preferred form of my invention, the pressure plate 8 is formed as one half of a mold comprising portions 8 and 9, the mold being formed by placing plaster of Paris or similar material in a split molding tray, placing the tray in a holder against the tooth to be filled and portions of the adjacent tooth, so as to give an impression of the contours of the teeth and gums in the selected area. This operation is performed after the cavity has been prepared and has been temporarily filled or, if the cavity is extremely small prior to preparation, before any preparation has been performed.

In detail, the method of preparing and filling a tooth with acrylic material utilizing the devices illustrated is as follows.

The holder 10, comprising the handle portion 11 and the tray-like member 12 pivoted thereto at point 13 first has placed thereon the two halves of my split molding tray 14 and 15. These two halves, which together form the split molding tray, conform generally to the shape of the tray-like portion 12 of the holder 10. The upstanding portions of the member 12 are notched at 16 and 17 and cooperate with bent over portions 18 and 20 of members 14 and 15 respectively to hold the members 14 and 15 in their proper position on member 12.

After assemblage of the parts as indicated above, the split tray comprising portions 14 and 15 is filled with plaster of Paris and placed over a tooth having a cavity to be filled in the manner shown in Figure 1 and permitted to harden. It is to be understood that prior to taking the impression in the manner described above, any surface cavity has been filled with gutta-percha or the like so that the tooth outline is that of the normal tooth without any surface impairment. After the plaster of Paris has hardened, the mold holder and mold are removed from the tooth and the plaster of Paris, together with the two halves 14 and 15 of the split molding tray, are removed from the holding device 10 and the plaster of Paris mold is then broken apart along the line formed by the edges 21 and 22 of the members 14 and 15.

Next the tooth cavity is prepared for filling in the usual manner and, after preparation, is filled with plastic material such as an acrylic resin. When the filling is completed, the plaster of Paris impression 8 of the rear of the tooth, in its tray portion 15, is placed in the position in which it was originally made.

Next, the front portion 9 of the plaster of Paris impression is placed over the forward portion of the tooth likewise in the identical position which it occupied when the impression was taken. It will be noted that these operations may be performed without any sliding action, the two halves being merely placed upon the two surfaces. Thus there is no disturbance of the filling.

As will be obvious, it is not necessary that the front portion 9 of the plaster of Paris impression be utilized to hold the plastic filling in position. Instead, a small plate made from gold or the like may be shaped to generally conform to the front of the tooth and may be utilized as the forward element of the clamping means. As will be clear also, the clamping means is not necessarily of the spring type as illustrated in the drawings, but may be constructed in any other similar manner, such for example as a screw clamp.

After the two portions have been placed upon and about the tooth as described, a clamp illustrated particularly in Figure 2 is placed on the two molding tray portions 14 and 15 and holds them in position with the plaster of Paris impression firmly positioned on the tooth and against the filling. The clamping device may be of any desirable construction, but in the present instance comprises a spring clamp consisting of the two arms 30 and 31 pivoted at the point 32 and spring-pressed outwardly at the handle ends by means of the leaf spring 33. The arms 30 and 31 extend upwardly and have lugs 34 and 35 formed thereon, these lugs cooperating with the depressions 36 and 37 of members 14 and 15 respectively.

It will be seen that by the method described and by the utilization of my split molding tray, a plastic filling may be held in position for any desired period without depending upon manual holding thereof so that the filling will be undisturbed during the period necessary for the plastic material, generally acrylic resin, to set.

While I have described a preferred form of my invention, it will be obvious that other modifications may be readily devised. Therefore, I wish to be limited not by the foregoing description which was given solely for the purpose of illustration, but on the contrary, to be limited only by the claim granted to me.

What is claimed is:

A device for preparing a split mold of a tooth to be thereafter used to hold a cavity filling in place during setting thereof, comprising, in combination, a handle, a short, straight channel member pivotally mounted on said handle, the upper edges of said channel being notched, and a split molding tray adapted to be held in said holder, said split tray comprising a pair of angle members conforming to the shape of the channel sides, each said member having a bent over lug thereon at the top, said lugs conforming with said notches in said channel, each said member being provided with a depression in its vertical wall, said depressions being opposite each other to cooperate with a clamping means, whereby said members with hardened molding material therein may be clamped about a tooth to hold the filling during setting.

F. WILBUR BAUM.

REFERENCES CITED

The following references are of record in the file of this patent:

UNITED STATES PATENTS

| Number | Name | Date |
|---|---|---|
| 583,848 | Dunlap | June 1, 1897 |
| 1,323,832 | Chige | Dec. 2, 1919 |
| 1,499,344 | Chige et al. | July 1, 1924 |
| 2,267,836 | Parkin | Dec. 30, 1941 |
| 2,428,689 | Sykes | Oct. 7, 1947 |